Oct. 3, 1967  A. A. HARBAN  3,345,431
METHOD FOR PREPARING BLOCK COPOLYMERS OF MONOOLEFINS
Filed July 24, 1964
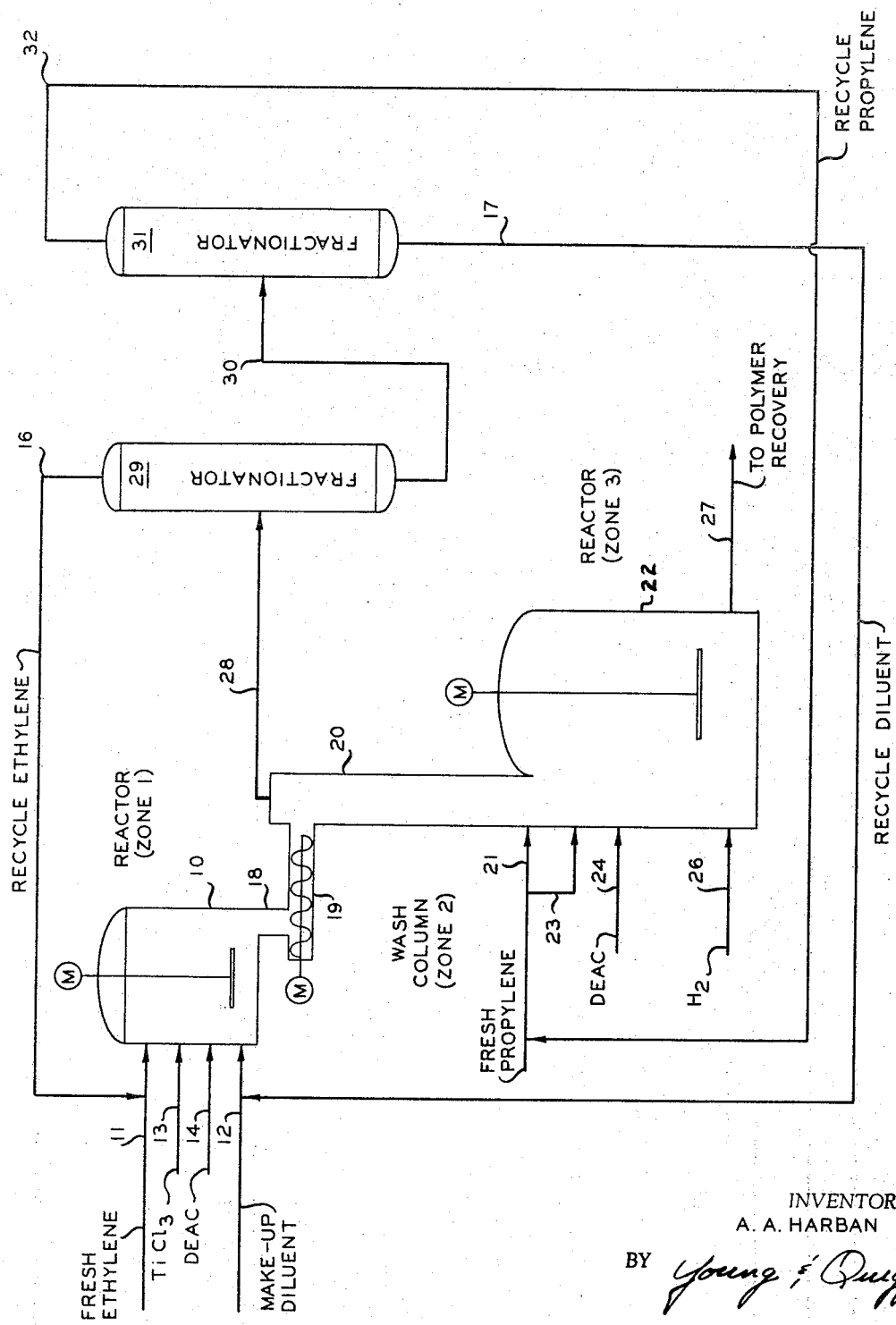
INVENTOR.
A. A. HARBAN
BY *Young & Quigg*
ATTORNEYS United States Patent Office 3,345,431
Patented Oct. 3, 1967

3,345,431
METHOD FOR PREPARING BLOCK
COPOLYMERS OF MONOOLEFINS
Arthur A. Harban, Bartlesville, Okla., assignor to Phillips
Petroleum Company, a corporation of Delaware
Filed July 24, 1964, Ser. No. 384,872
4 Claims. (Cl. 260—878)

This invention relates to apparatus suitable for the copolymerization of mono-1-olefins, such as ethylene and propylene, each in the substantial absence of the other. This invention also relates to a method of making block copolymers of mono-1-olefins.

It is known that mono-1-olefins can be polymerized sequentially in such a manner that the polymer molecules contain distinct polymer segments or blocks which are non-identical and which contribute significantly to the properties of the total polymer. The preparation of block copolymers is described in British patent specification No. 889,659 of Phillips Petroluem Company. One type of polymer which can be made in accordance with the procedure described is a polymer in which each block is made up essentially of only one type of monomer. In this case the polymerization of each monomer is carried out in the substantial absence of a different monomer. It has been found that very valuable properties can be obtained by copolymerizing mono-1-olefins in this manner and that similar results cannot be realized by making physical blends of different homopolymers based on the same monomers and combined in the same proportions. For example, block copolymers of ethylene and propylene can be prepared so that the polymer molecules contain a polyethylene block and a polypropylene block. This product has much better impact strength and low temperature properties than does a physical blend of polyethylene and polypropylene of the same proportions of ethylene and propylene.

Although block copolymers of the type described above can be readily prepared on a laboratory scale, in continuous commercial operations many problems are involved which are not present in conventional processes directed to the formation of homopolymers or random copolymers of the same monomers. One of the difficulties lies in obtaining complete removal of unreacted monomer or consumption of all of the monomer which is used first so that it will not be present in the system when the second monomer is polymerized. Another very critical problem is that of maintaining the first polymer and the catlyst associated therewith in an active state so that when the second monomer is polymerized, the second block is added to the molecules of the first polymer. If the first polymer is inactivated during the procedure in which the monomers are being changed, the result obtained is merely a physical blend of indepedent homopolymer molecules so that the advantages of block copolymerization as discussed above are not realized. On a laboratory scale these difficulties can easily be overcome by using the same polymerization catalyst and diluent for the polymerization of both monomers, the first monomer being either completely consumed or any unreacted monomer being removed from the polymerization mixture by vaporization. On a commercial scale, however, carrying out the first polymerization to completion may require an unduly long residence time. Also, the complete removal of monomer by vaporization, even where an inert gas is used for stripping purposes, is an expensive and time-consuming operation.

According to the present invention, a method is provided whereby mono-1-olefins can be copolymerized, each in the substantial absence of the other, so that the resulting product is a block copolymer in which the individual polymeric blocks are homopolymers. The method of this invention comprises contacting one of the olefins in a first reaction zone with a coordination catalyst system formed from at least two components, one of which is a compound of a metal of Groups IV–B, V–B, VI–B, of VIII of the Periodic Chart and a second component is a reducing agent based on a metal of Groups I–A, II–A, or III–A, under polymerization conditions and in an inert liquid diluent which has a boiling point substantially different, e.g., at least 5 to 10° F., from said olefins thereby forming a slurry of homopolymer in said diluent. This slurry is then passed to the upper portion of a vertically elongated washing zone where the polymer is allowed to settle to the bottom while it is washed countercurrently with a rising stream of the other olefin which is introduced as a liquid into the lower portion of the washing zone in sufficient amount to give the required upward liquid flow. The polymer is then passed from the washing zone into a second reaction zone where it is contacted with said other olefin and additional reducing agent under polymerization conditions. A stream which is a mixture of both olefins and diluent is withdrawn from the top of the washing zone and fractionated to form separate streams of each olefin and a stream of diluent. The first olefin and diluent are recycled to the first reaction zone while the other olefin is recycled to said washing zone. The polymer product is withdrawn from said second reaction zone. The Periodic Chart referred to in connection with the catalyst system is the Periodic Chart of the Elements by H. G. Deming, Lange's Handbook of Chemistry, sixth edition, Handbook Publishers, Inc., Sandusky, Ohio (1946).

In the apparatus aspect of this invention, a first reactor is provided with means for injecting monomer, diluent and catalyst in combination with an elongated wash zone column, means for passing polymer slurry from the first reactor to an upper portion of said column, means for introducing liquid olefin to the lower portion of said column, a second reactor connected to receive the polymer solids from the bottom of said column, means for injecting monomer and one catalyst component to said second reactor, means for withdrawing a stream from the top of said column, means for fractionating said stream to form separate streams of each monomer and of diluent, means for recycling one monomer and diluent to said first reactor, means for recycling the other monomer to said wash column, and means for withdrawing polymer from said second reactor. In a preferred aspect of the invention, the wash column is a narrowed extension of the second reactor so that the polymer formed in the first reactor can be permitted to flow directly down through the wash column and into the second reactor while at all times maintained in a liquid suspension, first of the inert diluent and then of the liquid second monomer.

It is an object of my invention to provide apparatus suitable for the continuous block copolymerization of mono-1-olefins, each in the substantial absence of the other.

It is another object of my invention to provide a method of sequentially polymerizing mono-1-olefins in the absence of each other so that a product having improved impact strength and low temperature brittleness is obtained.

Another object is to provide apparatus and procedure for continuously copolymerizing ethylene and propylene sequentially so that the propylene is polymerized in the presence of the polymerized ethylene but in the substantial absence of ethylene monomer.

Another object is to provide a method of block copolymerizing ethylene and a higher mono-1-olefin using a minimum of inert reaction diluent for the total operation.

Other objects, advantages, and features of my invention will be apparent to those skilled in the art from the following discussion and drawing which is a schematic flow diagram of the process and apparatus features of my invention.

The present invention is of greatest value as applied to the block copolymerization of ethylene and propylene where the ethylene is polymerized first and then the propylene is polymerized in the presence of the polyethylene. The invention can be used, however, for the block copolymerization of any mono-1-olefin having from 2 to 8 carbon atoms such as 1-butene, 1-pentene, 4-methyl-1-pentene, 1-octene, and the like.

The catalyst which is employed can be any of the catalyst systems commonly referred to as coordination polymerization catalysts. Such catalysts are formed from at least two components, one of which is a compound of a metal selected from Groups IV–B, V–B, VI–B, or VIII of the Periodic Chart, and the second component is a reducing agent, normally an organometal, metal hydride, or metal of Groups I–A, II–A or III–A. These catalyst systems are well known and many examples are available from the literature. Examples of component combinations which are representative include n-butyllithium and titanium tetraiodide; dicyclopentylzinc and titanium butoxide; ethylmagnesium bromide and titanium hydride; triethylaluminum or triphenylaluminum and molybdenum pentachloride; sodium hydride, barium hydride or gallium hydride and iridium chloride; sodium, magnesium or aluminum and vanadium tetrachloride, and the like.

The catalyst systems used in this invention must, of course, be capable of polymerizing mono-1-olefins in mass polymerization and under conditions such that solid polymer is produced in particle form. Preferably the catalyst components include a metal salt and an organometal compound as the reducing agent. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is a hydrogen or a halogen, including chlorine, bromine, iodine and fluorine, M is aluminum, gallium, indium or thallium, $n$ is from 1 to 3, inclusive, $m$ is from 0 to 2, inclusive, and the sum of $m$ and $n$ is equal to the valence of the metal M, and (b) a halide of a metal of Group IV–B, V–B, VI–B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ include triethylaluminum, triisobutylaluminum, triphenylaluminum, triethylgallium, tricyclohexylgallium, tri-n-butylindium, triethylthallium, diethylaluminum hydride, ethylaluminum dichloride, diethylaluminum chloride, phenylgallium dibromide, eicosylaluminum diiodide, di-(3-phenyl-1-methylproply)indium chloride, and the like.

Preferably the metal salt is a metal halide of a Group IV–B metal, namely titanium, zirconium, hafnium or germanium. These solids include both the tri- and tetrachlorides, bromides and iodides and can be used individually or as mixtures of two or more metal halides. The preferred salt is titanium trichloride and the preferred catalyst system is diethylaluminum chloride plus the reaction product of aluminum and titanium tetrachloride, said reaction product having the approximate formula $TiCl_3 \cdot 1/3 AlCl_3$.

In these catalyst systems, the mole ratio of the reducing agent to the metal salt is usually in the range of 1:1 to 10:1, and preferably in the range of 2:1 to 5:1. Concentration of the catalyst in the polymerization zone is normally in the range of 0.01 to 5 weight percent based on the monomer charged to that zone, although greater or lesser amounts can be used. In the polymerization of the first monomer, an inert liquid hydrocarbon diluent is used, including the paraffins and cycloparaffins having from 3 to 12 carbon atoms per molecule such as propane, n-butane, n-hexane, n-heptane, n-dodecane, isooctane, cyclopentane, cyclohexane, and the like. This diluent should differ substantially in boiling point from the olefins so that more efficient separation by fractionation can be made. When ethylene and propylene are the first and second monomers, any of the indicated diluents may be used. Polymerization conditions are maintained in both polymerization stages so that the polymer is formed as a solid particle and the reaction mixture is a slurry of solid polymer and liquid diluent or liquefied monomer. Suitable polymerization temperatures can vary from about 0 to 200° F. and are preferably maintained in the range of about 90 to 150° F. The pressure is that required to maintain the reaction medium in the liquid phase although higher pressures can be used.

Referring now to the drawing, a first reactor 10 is provided with means for introducing fresh ethylene through conduit 11, fresh diluent through conduit 12, and catalyst components through conduits 13 and 14. Titanium trichloride is added by way of conduit 13 while diethylaluminum chloride is injected through conduit 14. Reactor 10 can be any known type of polymerization vessel such as a stirred pot reactor or a pipe loop reactor. Recycle ethylene is also added with the fresh ethylene, entering through conduit 16, and recycle diluent is brought to reactor 10 through conduit 17.

The polymerization conditions are such as to cause the polyethylene to be formed as a suspension of polymer solids in the diluent. As the polymerization proceeds, polymer solids accumulate in settling leg 18 connected to the bottom portion of reactor 10. These solids in slurry form, for example about 30 to 35 percent solids, pass into auger conveyor 19 and are thence carried into the upper portion of wash column 20.

In wash column 20 the polymer solids settle toward the bottom thereof and are contacted in countercurrent flow with liquid propylene which is introduced into the lower portion of column 20 through conduit 21. The rate at which the liquid propylene is introduced into column 20 is sufficiently high to cause an upward flow of liquid, thereby washing inert diluent and unreacted ethylene from the polymer solids which continue to settle from column 20 into a second reactor 22. The use of propylene also assists the settling of the polymer because of the difference in density. Propylene is introduced into reactor 22 through the settling column with the polymer solids but can also be added by way of a separate conduit 23. Also, fresh catalyst reducing agent, e.g., diethylaluminum chloride, is introduced to reactor 22 through line 24. Hydrogen can also be introduced to this reactor through conduit 26 and is sometimes desired for molecular weight control.

Polymerization conditions are maintained in reactor 22 so that the propylene is polymerized in the presence of the preformed polyethylene particles which contain residues of the titanium trichloride which was introduced to reactor 10. Since the diethylaluminum chloride is soluble in the diluent, this portion of the catalyst is removed in the washing column 20, necessitating the addition of fresh reducing agent to reactor 22. The polyethylene formed in reactor 10 together with its associated catalyst residues is thereby kept in an active condition so that the polypropylene formed in reactor 22 is formed as a second polymer segment rather than as distinct and separate polymer. This is apparent from the improved physical properties of the product. The advantages of block copolymerization are thereby realized on a continuous basis. The polymer product containing both polymerized ethylene and propylene is removed from reactor 22 through conduit 27.

A stream containing unreacted ethylene, diluent and propylene is removed from the top of wash column 20 through conduit 28 and passed to fractionator 29. There is taken overhead a pure ethylene stream which is recycled to reactor 10 through conduit 16. Bottoms stream from fractionator 29 is passed through conduit 30 into fractionator 31, which can effect essentially complete separation between the propylene and the diluent. Diluent free of propylene is withdrawn from the bottom of fractionator 31 and passed through conduit 17 back to reactor 10. The overhead from fractionator 31 is substantially pure propylene and is passed through conduit 32 back to wash column 20, entering with the fresh propylene through conduit 21. Since the ethylene has been removed, some inert diluent can be tolerated in the overhead stream 32 but a very high separation efficiency can be realized by this method.

Under normal conditions the residence time for the reaction mixture in reactor 10 is about 15 to 180 minutes. This time can be varied to control the amount of polymerized ethylene in the final product. The residence time of the polymer in the washing zone can be, for example, about 5 to 20 minutes while the residence time in reactor 22 is in the range of about 15 to 180 minutes. This reactor is operated liquid full. Conventional fractionation equipment and methods are used in the combination described to separate the components in the overhead stream from wash column 20. The polymer which is withdrawn through conduit 27 is passed to conventional recovery and polymer finishing steps. When hydrogen is used in reactor 22 for control of polymer properties, ordinarily about 0.05 to 0.5 mole percent is employed, based on the propylene being polymerized.

To illustrate further the operation of the invention, the following example is presented in which conditions, proportions and materials are typical only and should not be construed to limit the invention unduly.

In a first reactor ethylene is polymerized in particle form in n-pentane diluent by contacting the monomer with a catalyst formed by mixing diethylaluminum chloride and the reaction product of aluminum and titanium tetrachloride, this reaction product having the approximate formula TiCl$_3$ · 1/3 AlCl$_3$. The mole ratio of diethylaluminum chloride to titanium trichloride is 2:1 and the catalyst concentration is 0.05 weight percent based on the monomer. A polymer slurry containing 35 weight percent polymer solids in n-pentane is passed from the first reactor into a wash column where the polymer settles into a second reactor. The same conditions are used in the second reactor where propylene is polymerized, 0.1 mole percent hydrogen based on the propylene being used in this reactor. The temperature in both reactors is 120° F. The pressure in both reactors and in the washing zone is 400 p.s.i.g. Liquid propylene is introduced at the bottom of the wash zone at a rate sufficient to flow upwardly, washing diluent and ethylene from the descending polymer. The temperature in the washing zone is 110° F. The residence time in the first reactor is 30 minutes, in the washing zone 10 minutes, and 120 minutes in the second reactor. A copolymer which contains 14 percent polyethylene is recovered from the effluent of the second reactor. This polymer product has a lower brittleness temperature and higher impact strength than either polypropylene or a blend of polypropylene and polyethylene in the same proportions.

As will be apparent to those skilled in the art, various modifications can be made in this invention without departing from the spirit or scope thereof.

I claim:

1. A method of block copolymerizing two different mono-1-olefins, each in the substantial absence of the other, which comprises contacting one of said olefins in a first reaction zone with a coordinating catalyst system formed from at least two components which are a metal compound and a reducing agent under polymerization conditions in an inert liquid diluent having a boiling point substantially different from said olefins, thereby forming a slurry of first polymer in said diluent, passing said slurry to the upper portion of a vertically elongated washing zone wherein said first polymer is allowed to settle, introducing the other of said olefins in liquid phase to the lower portion of said washing zone in sufficient amount to cause upward flow of some of said other olefin, passing said first polymer, some of said other olefin and additional reducing agent catalyst component into a second reaction zone which is maintained under polymerization conditions, withdrawing from said washing zone an overhead stream containing said olefins and said diluent, fractionating said overhead stream to separate each olefin and diluent, recycling said one olefin and said diluent to said first zone and said other olefin to said washing zone, and withdrawing from said second zone a polymer of said olefins.

2. The method of claim 1 wherein said one olefin is ethylene and said other olefin is propylene.

3. A method of block copolymerizing ethylene and a higher mono-1-olefin, each monomer being polymerized in the substantial absence of the other, which comprises contacting ethylene in a first reaction zone under polymerization conditions with a coordination catalyst system formed by mixing at least two components, one component being a halide of a metal selected from the group consisting of Groups IV–B, V–B, VI–B and VIII of the Periodic Chart and another component being an organometallic reducing agent of a metal selected from the group consisting of Groups I–A, II–A and III–A of the Periodic Chart, in an inert liquid hydrocarbon diluent higher boiling than said higher mono-1-olefin thereby forming a slurry of polyethylene in said diluent, removing polyethylene solids and diluent from said first reaction zone and passing same to the upper portion of a vertically elongated washing zone wherein said solids are permitted to settle and pass from the bottom of said working zone into a second reaction zone, introducing liquid higher mono-1-olefin into the lower portion of said washing zone in sufficient amount to cause said higher olefin to flow upwardly through said washing zone, withdrawing a stream of ethylene, diluent and higher olefin from the top of said washing zone, fractionating said stream to form separate streams of ethylene, higher olefin and diluent, recycling said ethylene and diluent streams to said first reaction zone and said higher olefin stream to said washing zone, introducing higher olefin and more catalyst component reducing agent to said second reaction zone, maintaining said second reaction zone under polymerization conditions to polymerize said higher olefin, and withdrawing from said second reaction zone a reaction product of polymerized ethylene and higher olefin.

4. The method of claim 3 wherein said higher olefin is propylene and said diluent is n-pentane.

References Cited

UNITED STATES PATENTS 3,155,640 11/1964 Etherington _____ 260—94.9
3,200,066 8/1965 Scoggin _____ 260—94.9

FOREIGN PATENTS 1,258,741 6/1960 France.

MURRAY TILLMAN, *Primary Examiner.*

D. J. BREZNER, *Assistant Examiner.*